(12) United States Patent
Koolmeister

(10) Patent No.: US 11,795,982 B2
(45) Date of Patent: *Oct. 24, 2023

(54) CONNECTION DEVICE FOR MOBILE FRAME STRUCTURES

(71) Applicant: Miles Koolmeister, Brooklyn Park, MN (US)

(72) Inventor: Miles Koolmeister, Brooklyn Park, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/844,774

(22) Filed: Jun. 21, 2022

(65) Prior Publication Data
US 2022/0316510 A1    Oct. 6, 2022

Related U.S. Application Data

(63) Continuation of application No. 16/439,249, filed on Jun. 12, 2019, now Pat. No. 11,371,541.

(60) Provisional application No. 62/684,274, filed on Jun. 13, 2018.

(51) Int. Cl.
*F16B 7/04* (2006.01)
*F16B 5/00* (2006.01)

(52) U.S. Cl.
CPC ............ *F16B 7/044* (2013.01); *F16B 5/0092* (2013.01); *F16B 7/046* (2013.01)

(58) Field of Classification Search
CPC .......... F16B 5/0092; F16B 5/10; F16B 7/044; F16B 7/046; F16B 7/20; F16B 21/04; B60P 3/343; E04H 15/08; E04F 10/0603; E04F 10/0614
See application file for complete search history.

(56) References Cited

U.S. PATENT DOCUMENTS

| 2,318,123 | A | * | 5/1943 | Segal | F16B 5/10 411/555 |
| 2,337,457 | A | * | 12/1943 | Dzus | F16B 5/10 439/564 |
| 2,472,651 | A | * | 6/1949 | Diaper | F16B 5/10 292/37 |
| 2,513,553 | A | * | 7/1950 | Dzus | F16B 5/10 411/555 |
| 2,527,408 | A | * | 10/1950 | Dzus | F16B 5/10 411/555 |
| 2,619,390 | A | | 11/1952 | Johnson | |
| 2,665,950 | A | | 1/1954 | Johnson | |

(Continued)

FOREIGN PATENT DOCUMENTS

FR    2620158    3/1989

*Primary Examiner* — Matthew R McMahon
(74) *Attorney, Agent, or Firm* — Edwin E. Voigt, II

(57) ABSTRACT

A connection device for mobile frame structures includes a bracket on a surface having a cam shaft and a cam lock has a spiral axial slot having a locking groove and a central cam groove. A cam follower, a spring and a force stop are positioned in the central cam groove. A retention device holds the components in the cam groove. A structural support is engaged to the cam lock. An intersection between the spiral axial slot and the central cam groove has one or more detents which engage the cam follower prior to engagement of the cam lock to the bracket. The cam shaft is positioned in the spiral axial slot and the cam lock is rotated moving the cam shaft into the locking groove and depressing the cam follower relative to the spring to lock the cam shaft into the locking groove.

13 Claims, 5 Drawing Sheets

(56) References Cited

U.S. PATENT DOCUMENTS

| | | | |
|---|---|---|---|
| 3,488,815 A | | 1/1970 | Metz |
| 3,675,280 A | * | 7/1972 | Winslade ................ F16B 21/04 |
| | | | 411/552 |
| 4,020,888 A | | 5/1977 | Upton |
| 4,227,287 A | | 10/1980 | Gunther |
| 4,378,615 A | * | 4/1983 | Gunther .................... F16B 5/10 |
| | | | 411/555 |
| 4,943,182 A | | 7/1990 | Hoblingre |
| 5,174,352 A | | 12/1992 | Murray |
| 5,622,214 A | | 4/1997 | Baka |
| 5,749,754 A | * | 5/1998 | Patterson ........... H01R 13/2421 |
| | | | 439/76.1 |

\* cited by examiner

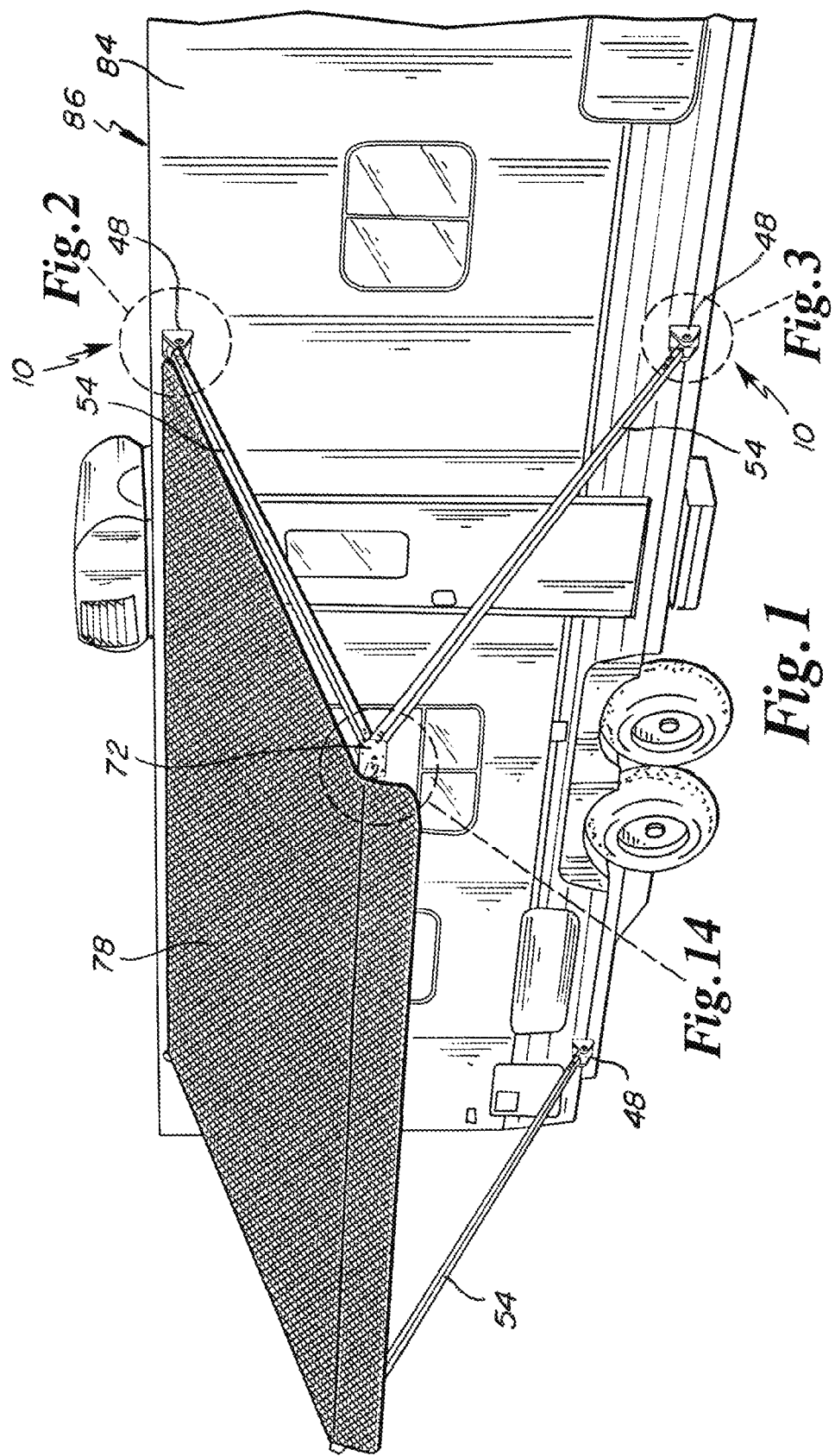

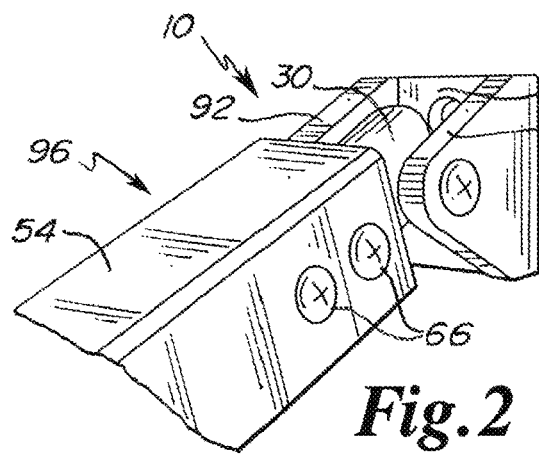
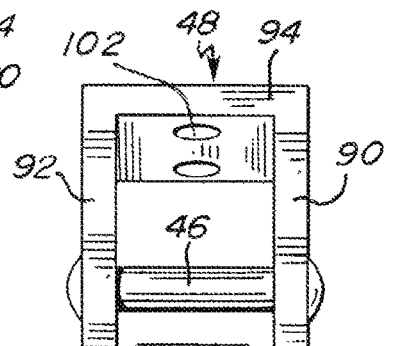
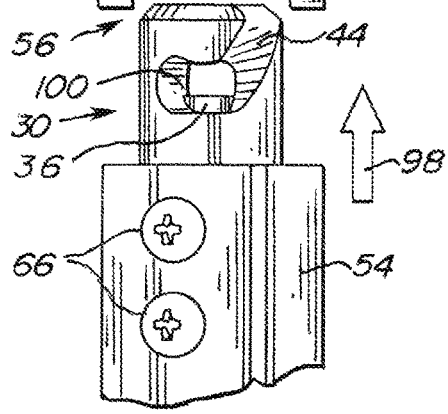
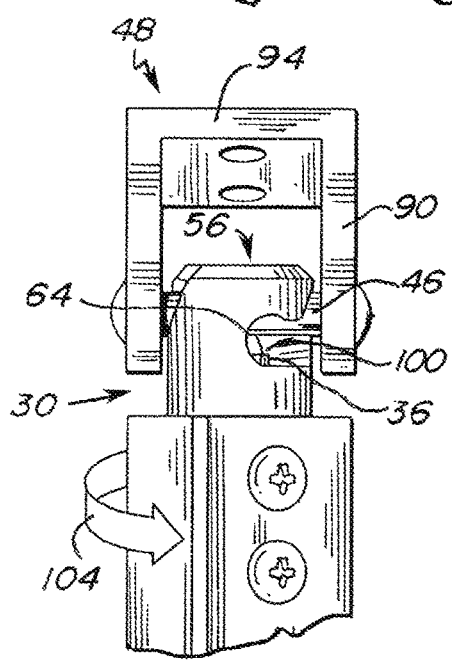
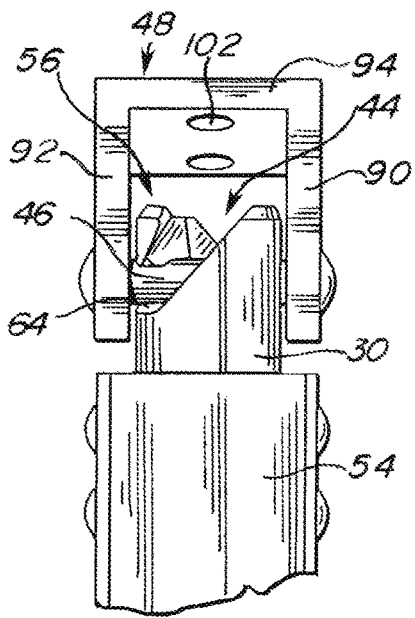
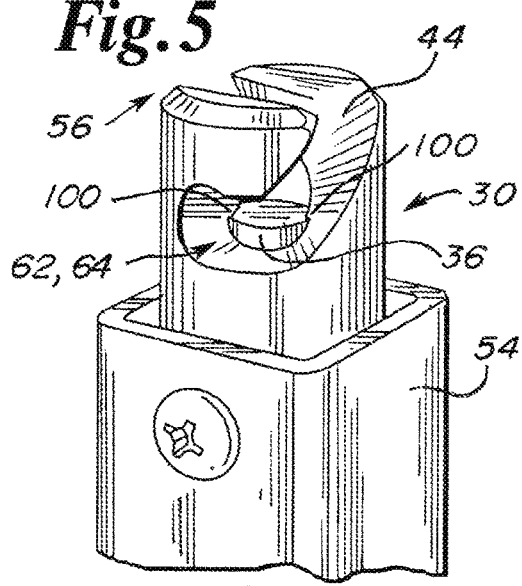

CONNECTION DEVICE FOR MOBILE FRAME STRUCTURES

CROSS-REFERENCE TO RELATED APPLICATIONS

This application is a continuation application claiming priority to and the benefit of U.S. patent application Ser. No. 16/439,249 filed Jun. 12, 2019, now U.S. Pat. No. 11,371,514 issued on Jun. 28, 2022. U.S. patent application Ser. No. 16/439,249 filed Jun. 12, 2019 claims the benefit of U.S. Provisional Patent Application Ser. No. 62/684,274 filed Jun. 13, 2018. All of the above identified patents, patent applications and provisional patent applications being incorporated by reference herein in their entireties.

FIELD OF THE INVENTION

This application in general is directed to a connection device and method for erection and disassembly of a temporary mobile event frame structure or apparatus such as an awning canopy shelter frame.

BACKGROUND

In the past it has been very difficult to erect and to dissemble temporary mobile event frame structures/apparatus such as awning canopy shelter frames. In the past individuals attempting to erect the temporary mobile frame structures have been required to transport ladders, step stools, step ladders or other structures for an individual to stand upon, in order to reach upwardly to releasably secure a frame member to a bracket as mounted at an elevated location relative to a vertical surface.

During erection and disassembly activities, individuals were frequently required to reach and to stretch into an unstable or unsafe position, and to feel for an opening in a bracket on a vertical wall surface. The individuals then attempted to lift, hold and align an opening in a support frame with the opening in the bracket, and then to insert a removable pin through both of the frame and bracket openings, without being able to visualize the location of the openings of the bracket and frame. These activities were frustrating and unsafe to individuals and frequently resulted in an individual falling.

In addition, the devices and methods know in the past to erect the temporary mobile frame structures required the transportation of clumsy and space consuming step ladders, ladders, step stools or platforms to facilitate assembly. Further, the known devices and methods to erect the temporary mobile frame structures were inconvenient and required a significant amount of time to erect or dissemble, which in turn wasted valuable man hours.

Further, depending on the design and type of temporary mobile frame structure to be used, more than one individual was required to participate in the set-up and disassembly activities, further consuming time and endangering the safety of more than a single individual.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In at least one embodiment the cam lock assembly includes a mating bracket which is mounted in an elevated location on a vertical surface. However, the bracket is not restricted to use on a vertical surface and may be mounted on any surface. The mating bracket includes a horizontally extending cam shaft, where the cam shaft is substantially parallel to a ground surface.

In at least one alternative embodiment, the cam lock assembly includes a cam lock which may be releasably secured to the cam shaft in a manner similar to a one-quarter turn fastener.

In some embodiments the cam lock includes a shaft engagement end having a spiral shaped locking axial slot which receives the cam shaft during engagement of the cam lock to the mating bracket.

In at least one embodiment the cam lock is substantially cylindrical in shape having a length and a frame engagement end opposite to the shaft engagement end.

In some embodiments the cam lock includes a central axis and a central cam groove extending from a location proximate to the locking axial slot and the frame engagement end to the shaft engagement end.

In another alternative embodiment, a cylindrical shaped cam follower, a spring and a cylindrical shaped force stop are disposed in the central cam groove.

In an alternative embodiment a channel extends through one wall of the cam lock proximate to the frame engagement end, extending through the central cam groove and into the opposite wall of the cam lock.

In at least one embodiment the force stop is used to hold the spring in a compressed configuration where a split pin is inserted into the channel engaging both of the walls of the cam lock. The compression of the spring exerts force onto the cam follower as positioned in the central cam groove towards the shaft engagement end.

In at least one embodiment the spring and the cam follower are further compressed during the rotation of the cam lock following the positioning of the cam shaft within the locking axial slot.

In at least one alternative embodiment the locking axial slot includes an internal locking end having a locking groove which receives the cam shaft upon complete rotation of the cam lock relative to the mating bracket.

In at least one embodiment upon the rotational positioning of the cam shaft within the locking groove, the spring will decompress and the cam follower will engage the cam shaft to secure the mating bracket to the cam lock.

In at least one embodiment the cam lock includes at least one tapped hole which receives a fastener used to secure the cam lock to a structural support. The cam lock may be secured to the structural support by welding or any other type of mechanical or chemical fastening alternative.

In at least one embodiment the structural support is elongate having a bracket engagement end, the bracket engagement end having a fastener receiving aperture.

In at least one embodiment a bracket having a plurality of paired apertures is positioned proximate to the bracket engagement end where at least one of the paired apertures is disposed in alignment with the fastener receiving aperture.

In at least one embodiment a releasable bracket fastener is disposed through the at least one paired apertures and the fastener receiving aperture to releasable secure the bracket to the bracket engagement end.

In at least one embodiment a removable cover is disposed over the cam lock assembly.

In at least one embodiment, a cam lock assembly includes a bracket having a cam shaft, where the bracket engages a vertical or another surface. The cam lock assembly includes a cam lock having a spiral axial slot having a locking groove. The cam lock further includes a traverse channel proximate to a frame engagement end. The cam lock also includes a central cam groove between the locking groove and the frame engagement end. A cam follower is positioned in the central cam groove, a spring is positioned in the central cam groove adjacent to the cam follower and a force stop is positioned in the cam groove adjacent to the spring opposite to the cam follower. The cam lock has a retention device disposed in the traverse channel and an elongate structural support is engaged to the cam lock proximate to the frame engagement end. The cam shaft is positioned in the spiral axial slot and the cam lock is rotated relative to the cam shaft moving the cam shaft into the locking groove. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft within the spiral twist locking axial slot 44.

In another embodiment, the cam shaft is positioned outwardly from the vertical or another surface, and the cam shaft is disposed in a plane substantially parallel to the vertical or another surface.

In at least one embodiment, the cam lock has a shaft engagement end which includes the spiral axial slot.

In some embodiments, the cam lock has a central axis, and the central cam groove is centered relative to the central axis.

In another embodiment, the central cam groove is in communication with the locking groove defining an intersection and the traverse channel extends through the central cam groove.

In some embodiments, in an first state the spring is compressed and the force stop is engaged to the retention device and the intersection defines at least one detent where the cam follower is in contact with the detent in an unlocked position.

In at least one embodiment, the positioning of the cam shaft in the cam groove depresses the cam follower against the spring.

In at least one embodiment, the cam lock is cylindrical in shape.

In another embodiment, a cam lock assembly includes a bracket having a cam shaft where the bracket is engaged to a vertical or another surface. The cam shaft is positioned outwardly from the vertical or another surface and is disposed in a plane substantially parallel to the vertical or another surface. A cam lock having a shaft engagement end includes a spiral axial slot which in turn has a locking groove. The cam lock additionally has a frame engagement end having a traverse channel. The cam lock further includes a central axis and a central cam groove along the central axis. The central cam groove is in communication with the locking groove defining an intersection. The central cam groove extends from the intersection to the frame engagement end, and the traverse channel extends through the central cam groove. A cam follower is positioned in the central cam groove, a spring positioned in the central cam groove adjacent to the cam follower and a force stop is positioned in the cam groove adjacent to the spring opposite to the cam follower. The cam lock further includes a retention device disposed in the traverse channel, wherein in an first state the spring is compressed and the force stop is engaged to the retention device. In the first state the intersection defines at least one detent, and the cam follower is engaged to the detent. An elongate structural support is engaged to the frame engagement end, and the cam shaft is positioned in the spiral axial slot where the cam lock is rotated relative to the cam shaft moving the cam shaft into the locking groove. When the cam shaft is in the locking groove the cam shaft depresses the cam follower against the spring. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft within the spiral twist locking axial slot 44.

In some embodiments, the frame engagement end has at least one tapped hole and the elongate structural support is engaged to the at least one tapped hole. Additionally, the elongate structural support and the cam lock have a disassembled position relative to the mating bracket and an initial engaged position where the cam shaft is disposed in the spiral axial slot proximate to the shaft engagement end.

In a preferred embodiment the cam lock is rotated approximately 90 degrees, moving the cam shaft into the locking groove and the cam follower engages the cam shaft in a locking position where the spring exerts frictional force between the cam follower and the cam shaft in the locking position. It should be noted that the rotation of the cam lock relative to the mounting shaft in some embodiments may be more or less than 90 degrees.

In one embodiment, the elongate structural support has an opposite end having a structural connector. The structural connector includes a fastener receiving aperture which is in a plane substantially parallel to the cam shaft in the locking position.

In at least one embodiment the cam lock assembly includes a bracket having at least one pair of aligned apertures, and the structural connector is positioned proximate to the bracket aligning the fastener receiving aperture to the at least one pair of aligned apertures in the locking position. A releasable bracket fastener may be positioned through the fastener receiving aperture and the at least one pair of aligned apertures in the locking position.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 1 is an environmental view of one alternative embodiment of the cam lock assembly;

FIG. 2 is a detail isometric perspective view of one alternative embodiment of the cam lock assembly engaged to a mating bracket;

FIG. 4 is a detail front elevation view of one alternative embodiment of the cam lock and mating bracket;

FIG. 5 is a detail front elevation view of one alternative embodiment of the cam lock partially engaged to the mating bracket;

FIG. 6 is a detail front elevation view of one alternative embodiment of the cam lock fully engaged to the mating bracket;

FIG. 7 is a perspective view of one alternative embodiment of the cam lock;

DETAILED DESCRIPTION OF THE PREFERRED EMBODIMENTS

Figure 3:
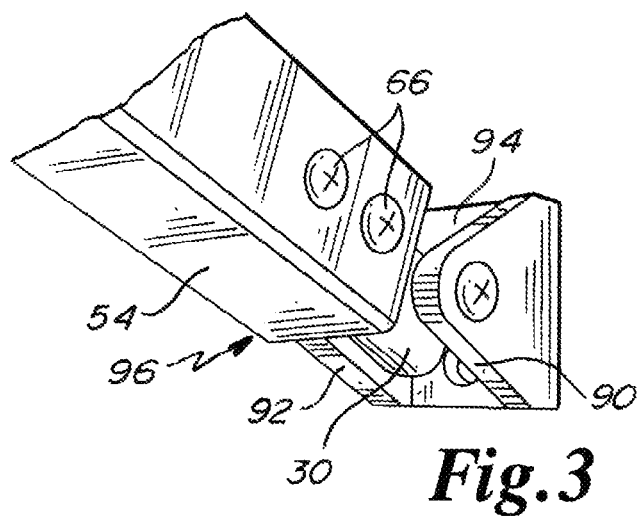
FIG. 3 is a detail isometric perspective view of one alternative embodiment of the cam lock assembly engaged to a mating bracket.

In general the cam lock assembly is referred to by reference numeral 10. Referring to FIG. 1, in at least one embodiment, the cam lock assembly 10 may be used to support a removable cover or awning 78 in an operative position to provide shade relative to a vertical or another surface 84 on a structure such as a trailer 86. The removable cover or awning 78 may be supported in an open operative position through the use of a plurality of mating brackets 48, brackets 72 and tubular frames or structural supports 54.

In a preferred embodiment, one end of a tubular frame or structural support 54 will include a cam lock 30 which releasably engages a mating bracket 48 as affixed to a vertical or another surface 84. The releasable engagement between the cam lock 30 and the mating bracket 48 significantly simplifies and accelerates the erection or disassembly of the removable cover or awning 78 into an operative shade configuration or to a storage transportation configuration. The use of the cam lock 30 and mating bracket 48 eliminates a need for an individual to transport or use step ladders, step stools, ladders or other equipment in order to secure a structural support 54 to a vertical or another surface 84.

In some embodiments, the attachment of a structural support 54 without the cam lock 30 of the present invention is quite difficult, necessitating an individual to align apertures through a structural support 54, with apertures of a bracket, and to simultaneously insert a removable pin through all of the aligned apertures. These efforts may be extremely difficult due to the absence of convenient visualization of the aligned apertures, and the need to lift and to hold the structural supports 54 in a desired elevated position or location during insertion of the removable pin.

The cam lock assembly 10, cam lock 30 and mating bracket 48 provide quick connector frame components during the assembly of the removable cover 78 into an operative position, to provide shade adjacent to a vertical or another surface 84. In at least one embodiment, the cam lock 30 may be secured to the cam shaft 46 of a mating bracket 48 through rotation, in a manner similar in operation to a one quarter turn fastener. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft within the spiral twist locking axial slot 44.

In some embodiments, the cam lock 30 includes a spiral twist locking axial slot 44 which may have a chiral geometry for rotation in a clockwise direction for engagement and locking relative to the cam shaft 46. In an alternative embodiment, the cam lock 30 includes a spiral twist locking axial slot 44 which may have an achiral geometry for rotation in a counter-clockwise direction for engagement and locking relative to the cam shaft 46.

In some embodiments, the cam lock assembly 10 may be erected relative to a vertical or another surface 84 through the use of small and compact self-contained components of the cam lock 30 and mating brackets 48 without the use of tools or external fastening components. The cam lock assembly 10 is preferably used to support a removable cover or awning 78 adjacent to the vertical or other sides of the enclosed trailers as used during mobile portable temporary events such as racing, marketing, hospitality, and/or disaster relief to name a few. Alternatively, the cam lock assembly 10 may be used as a permanent attachment for a vertical or another surface 84.

In general, FIG. 2 shows a cam lock 30 engaged in a locking position relative to a mating bracket 48 as secured in an elevated location relative to a vertical or another surface 84. The mating bracket 48 includes a first support 90 and a second support 92. The first support 90 and second support 92 extend normally outwardly from a mating bracket base 94 as secured to a vertical or another surface 84. The distal end of the cam lock 30 is secured to a structural support 54 which may be square tubular in shape through the use of fasteners 66 which may engage tapped holes 52 in the cam lock 30. It should be noted that the structural support 54 may be of any shape as desired and may be triangular tubular, pentagon, hexagon, octagonal, round or any other shape as desired, so long as the structural support 54 is capable of secure engagement to the distal end of the cam lock 30. In some embodiments, the structural support 54 is not required to be tubular in configuration. In at least one embodiment, the operational end 96 of the structural support 54 may include the spiral twist locking axial slot 44 where the cam lock 30 is integral to the structural support 54. In other embodiments, the cam lock 30 may be secured to the structural support 54 by welding or any other type of mechanical or chemical fastening alternative.

In a preferred embodiment, the first support 90 and the second support 92 are substantially triangular in shape and are parallel relative to each other extending outwardly from the mating bracket base 94. The cam shaft 46 is located between the first support 90 and the second support 92 proximate to the outwardly extending vertices of the mating bracket 48.

In a preferred embodiment, the cam shaft 46 is secured between the first support 90 and the second support 92 by a rigid fastener such as a bolt, screw, or pin. Alternatively, the cam shaft 46 may be permanently affixed or integral to the first support 90 and second support 92 by welding or equivalent mechanical or chemical attachment mechanisms.

Continuing to refer in general to FIG. 2, the tubular frame 54 is shown descending angularly outwardly from an elevated mating bracket 48.

Referring in general to FIG. 3, FIG. 3 includes the components as identified relative to FIG. 2. In FIG. 3, the structural support 54 is shown ascending angularly outwardly from a mating bracket 48 as attached at a lower position relative to a vertical or another surface 84.

Referring in general to FIG. 4, the cam lock 30 is shown being aligned with the mating bracket 48 immediately prior to the engagement of the spiral twist locking axial slot 44 to the cam shaft 46 of the mating bracket 48. As may be seen in FIG. 4 the spiral twist locking axial slot 44 is offset relative to cam shaft 46 by approximately 90°. It should be noted that the spiral twist locking axial slot in other embodiments may be offset relative to the cam shaft 46 by more or less than 90 degrees. The movement of the cam lock 30 towards the cam shaft 46 is represented by arrow 98. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft within the spiral twist locking axial slot 44.

In FIG. 4, an individual is standing on a ground surface adjacent to a trailer 86 and vertical or another surface 84. The individual is grasping a structural support 54 and is holding the structural support 54 so that the cam lock 30 is elevated towards a mating bracket 48 as adjacent to a roof of a trailer 86. The individual is grasping the structural support 54 so that an edge or side of the structural support 54 is aligned to the cam shaft 46, and a face of the structural support 54 is offset relative to the cam shaft 46.

FIG. 4 also shows the cam follower 36 as elevated by the spring 38 and engaged to a pair of detents 100. The detents are located and formed between the spiral twist locking axial slot 44 and the locking groove 64. The cam shaft 46 is disposed in the locking groove 64 upon the complete engagement between the cam lock 30 and the mating bracket 48.

As may be seen in FIG. 4 the shaft engagement end 56 of the cam lock 30 may include a chamfered edge to facilitate the positioning of the cam shaft 46 within the spiral twist locking axial slot 44 when the cam lock 30 is moved in the direction of arrow 98 towards the mating bracket 48. The chamfer of the shaft engagement end 56 facilitates the initial insertion or alignment process between the cam shaft 46 and the spiral twist locking axial slot 44. It should be noted that the cam lock 30 may be inserted into the bracket 48 at any relative angle, and may be further twisted or rotated from any angle to lock the cam shaft 46 within the locking groove 64 from any angle. The angular orientation of the cam lock 30 relative to the bracket 48 does not interfere with the positioning of the cam shaft 46 within the spiral twist axial slot 44.

In some embodiments, the internal dimensions between the spiral walls of the spiral twist locking axial slot 44 proximate to the shaft engagement end 56 may be larger than the internal dimension between the spiral walls of the spiral twist locking axial slot 44 proximate to the locking end 62 and locking groove 64. The narrower dimension between the spiral walls of the spiral twist locking axial slot 44 proximate to the locking groove 64 enhances the locking of the cam lock 30 relative to the cam shaft 46, by reducing clearance between the components in the fully engaged and locked configuration.

In some embodiments, the mating bracket base 94 may include one or a plurality of affixation apertures 102 which may receive mechanical fasteners to secure the mating bracket 48 to a vertical or another surface 84.

As may be seen in FIG. 5, the shaft engagement end 56 and the spiral twist locking axial slot 44 have been advanced for engagement to the cam shaft 46. The cam lock 30 and the structural support 54 are initially rotationally offset, where an edge of the structural support 54 is in a normal relationship to a horizontal axis of the cam shaft 46. As may be seen in one embodiment, as depicted in FIG. 5, the structural support 54 and cam lock 30 may be rotated in a clockwise direction as represented by arrow 104.

The rotation of the structural support 54 and the cam lock 30 in a clockwise direction advances the cam shaft 46 into the spiral twist locking axial slot 44 towards the internal locking end 62 and locking groove 64. During rotational engagement of the cam lock 30 with the cam shaft 46 the edge of the structural support 54 rotates so that a face of the structural support 54 replaces the edge of the structural support 54 in the normal position relative to the horizontal cam shaft 46.

As may be seen in FIG. 6, the cam lock 30 has been fully rotated in a clockwise direction to position the cam shaft 46 into the locking groove 64 of the spiral twist locking axial slot 44. In the fully engaged position, the cam shaft 46 depresses the cam follower 36 and compresses the spring 38 moving the cam follower 36 toward the frame engagement end 58 within the central cam groove 34. In this position the cam follower 36 has been depressed from engagement relative to the detents 100. In a fully engaged position a face of the structural support 54 is aligned with horizontal axis of the cam shaft 46.

It should be noted that the cam lock 30 and structural support 54, in a preferred embodiment, are rotated approximately 90° in a clockwise direction to fully position the cam shaft 46 within the locking groove 64. It should be noted that the rotation of the cam lock 30 and the structural support 54 relative to the cam shaft 46 in some embodiments may be more or less than 90 degrees in order to completely dispose and position the cam shaft 46 within the locking groove 64.

In at least one alternative embodiment, the spiral twist locking axial slot 44 may have an achiral geometry which may be rotated in a counter-clockwise direction of approximately 90° in order to completely dispose and position the cam shaft 46 within the locking groove 64. It should be noted that the rotation of the cam lock 30 and the structural support 54 relative to the cam shaft 46 in some embodiments may be more or less than 90 degrees in order to completely dispose and position the cam shaft 46 within the locking groove 64. In this configuration the cam follower 36 is also depressed from engagement relative to the detents 100, compressing spring 38 and moving the cam follower 36 in the central cam groove 34 towards the frame engagement end 58 of the cam lock 30.

In at least one embodiment as shown in FIG. 7, the spring 38 has positioned the upper surface of the cam follower 36 into engagement with the pair of detents 100, at the bottom of the spiral twist locking axial slot 44.

Figure 8:
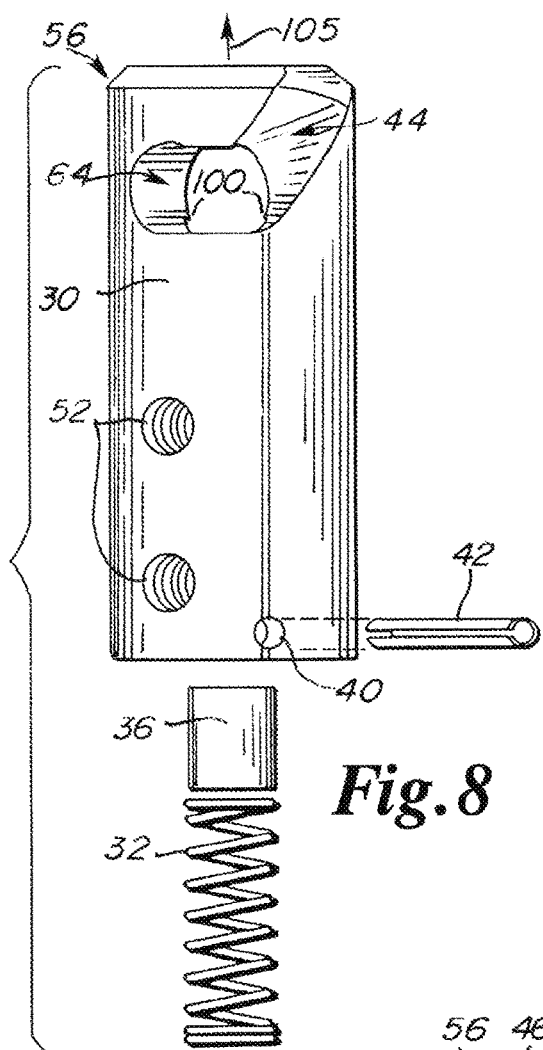
FIG. 8 is a detail exploded front elevation view of one alternative embodiment of the cam lock.

In at least one embodiment, as may be seen in FIG. 8, the cam lock 30 is substantially cylindrical in shape having the shaft engagement end 56 having a chamfered upper edge. The spiral twist locking axial slot 44 is disposed proximate and at least partially through the shaft engagement end 56.

In a preferred embodiment, the cam lock 30 has a vertical axis represented by line 105. The central cam groove 34 is disposed and aligned relative to the vertical axis 105 and center of the cam lock 30. The central cam groove 34, at the top, breaches the lower surface of the locking groove 64, and extends downwardly through the bottom of the frame engagement end 58. The intersection between the central cam groove 34 and the locking groove 64 forms a pair of detents 100. The pair of detents 100 function as positioning limiters preventing upward movement and positioning of the cam follower 36 into an undesirable elevated location within the locking groove 64.

In at least one embodiment, the cam lock 30 proximate to the frame engagement end 58 includes one or more tapped holes 52. The tapped holes 52 receive threaded mechanical fasteners 66 which have previously passed through a wall of the structural support 54. As may be seen in FIG. 8, the frame engagement end 58 additionally includes a channel 40. Channel 40 traverses one wall of the cam lock 30, the central cam groove 34, and enters the opposite internal wall of the cam lock 30. The channel 40 is preferably receives a mechanical retention device 42 which may be a split pin. In alternative embodiments the retention device 42 may be a split pin, a dowel pin, a screw, a welded plug, or other mechanical fastening or support element or structure.

In at least one embodiment, the cam follower 36 is cylindrical in shape having a diameter dimension which is smaller than the diameter dimension of the central cam groove 34. The cam follower 36 is inserted into the central cam groove 34 from the opening in the frame engagement end 58.

The spring 38 has a diameter dimension which is also smaller than the diameter dimension of the central cam groove 34. The spring 38 is inserted into the central cam groove 34 after the cam follower 36 has been inserted into the central cam groove 34. The upper end of the spring 38 engages the bottom surface of the cam follower 36.

The force stop 50 is preferably cylindrical in shape and has a diameter dimension which is smaller than the central cam groove 34. The force stop 50 preferably has a diameter dimension which is equal to the diameter dimension of the cam follower 36. The upper surface of the force stop 50 engages the lower end of the spring 38.

During assembly of the cam lock 30, compression force is applied to the lower surface of the force stop 50 to load the spring 38 as positioned between the force stop 50 and the cam follower 36. The cam follower 36 is prevented from upward movement out of the central cam groove 34 and into the locking groove 64 by detents 100. Compression is continued to be applied on the bottom surface of the force stop 50 until the bottom surface of the force stop 50 is positioned above the channel 40. In this configuration the mechanical retention device 42 may be inserted into the channel 40, completely through the first wall, and into the opposite wall of the cam lock 30.

The compression force upon the force stop 50 and spring 38 may then be released permitting the spring 38 to expand, separating the force stop 50 from the cam follower 36, and moving the bottom surface of the force stop 50 into engagement with the mechanical retention device 42.

Figure 9:
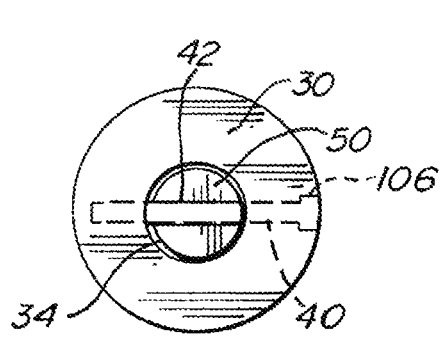
FIG. 9 is a detail bottom plan view of one alternative embodiment of the cam lock showing a channel for a retention device in phantom line.

In at least one embodiment as depicted in FIG. 9, the bottom of the frame engagement end 58 of the cam lock 30 is shown. The central cam groove 34 is centrally located relative to the bottom surface of the cam lock 30. As may be seen in FIG. 9, the force stop 50 is disposed in the central cam groove 34 and is retained in the central cam groove 34 by the retention device 42 as inserted within channel 40.

In at least one embodiment, channel 40 has an enlarged opening 106 to facilitate insertion of the retention device 42, which may be a pin, into the channel 40. In alternative embodiments the retention device 42 may be a split pin, a dowel pin, a screw, a welded plug, or other mechanical fastening or support element or structure. In a preferred embodiment, retention device 42 is a split pin and the channel 40 has a diameter dimension which is smaller than the diameter dimension of the split pin prior to compression. In a preferred embodiment, the split pin/retention device 42 compresses during insertion into the channel 40. The split pin/retention device 42 is secured within the channel 40 by friction and the inherent outward expansion pressure of the exterior wall of the split pin/retention device 42 on the interior of the channel 40.

Figure 10:
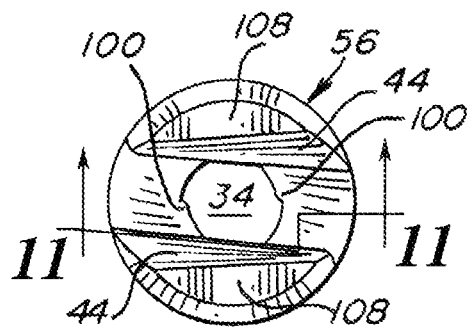
FIG. 10 is a detail top plan view of one alternative embodiment of the cam lock.

In at least one embodiment as depicted in FIG. 10, the top of the shaft engagement end 56 of the cam lock 30 is shown. As may be seen in FIG. 10, the cam follower 36, spring 38 and force stop 50 have not been disposed in the central cam groove 34. The central cam groove 34 at the upper end extends into the locking groove 64 forming a pair of detents 100, which limit the upward positioning of the cam follower 36, following assembly of the cam lock 30.

FIG. 10 additionally shows the spiral twist locking axial slot 44 descending from the shaft engagement end 56. The upper surface of the shaft engagement end 56 may, in at least one embodiment, include a pair of crescent shaped upper flat surfaces 108 as located between the upper edges of the oppositely disposed spiral twist locking axial slots 44 and the outer circumference of the cam lock 30.

Figure 11:
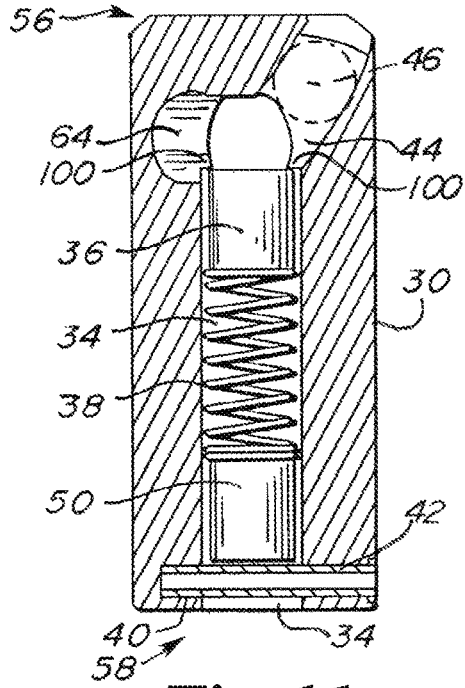
FIG. 11 is a detail cross-sectional side view of one alternative embodiment of the cam lock taken along the line 11-11 of FIG. 10, during initial engagement of the cam lock to the mating bracket.

In at least one embodiment, a cross-sectional side view of an assembled cam lock 30, as taken along the line 11-11 of FIG. 10, is shown. As shown in FIG. 11, the cam shaft 46 has been initially positioned within the spiral twist locking axial slot 44. The cam shaft 46 is shown in phantom line. In addition, FIG. 11 shows the cam follower 36, spring 38 and force stop 50 as positioned in the central cam groove 34. FIG. 11 additionally shows the retention device 42 as disposed in the channel 40 traversing the central cam groove 34 and securing the force stop 50, spring 38 and cam follower 36 within the central cam grove 34 of the cam lock 30.

Figure 12:
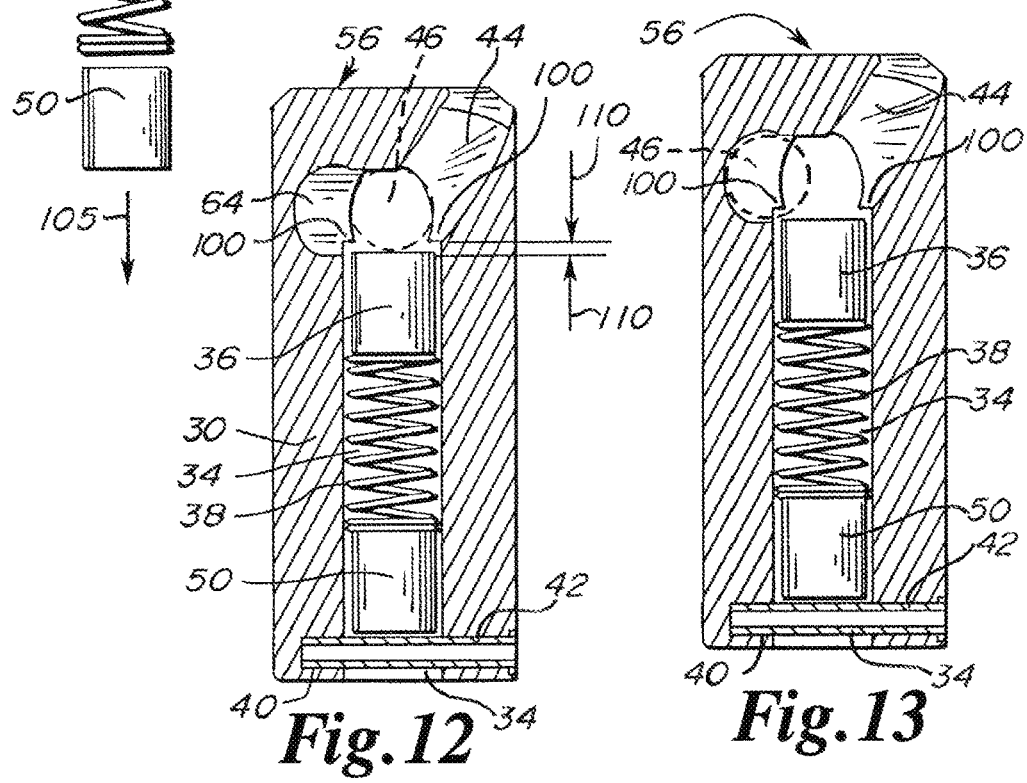
FIG. 12 is a detail cross-sectional side view of one alternative embodiment of the cam lock taken along the line 11-11 of FIG. 10, during engagement of the cam follower to the cam shaft.

Referring to FIG. 12, an alternative cross-sectional side view as taken along the line 11-11 of FIG. 10, shows the cam shaft 46 as disposed within the spiral twist locking axial slot 44 being in contact with the top surface of the cam follower 36. As may be seen in FIG. 12, the rotation of the cam lock 30 has moved the cam shaft 46 downwardly within the spiral twist locking axial slot 44 before contact with the upper surface of the cam follower 36. The rotation of the cam lock 30 in direction of arrow 104 forces the cam shaft 46 downwardly into engagement with the upper surface of the cam follower 36, depressing the cam follower 36 within the central cam groove 34, compressing spring 38, and establishing a space represented by arrows 110 between the upper surface of the cam follower 36 and the detents 100.

Figure 13:
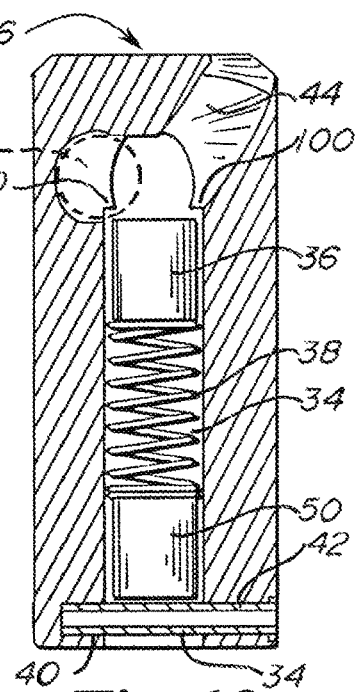
FIG. 13 is a detail cross-sectional side view of one alternative embodiment of the cam lock taken along the line 11-11 of FIG. 10, during locking engagement of the cam lock to the mating bracket.

As may be seen in FIG. 13, the further rotation of the cam lock 30 in the direction of arrow 104, moves the cam shaft 46 downwardly/inwardly into the locking groove 64. In this position the spring 38 is exerting upward force upon the cam follower 36. The cam follower 36 is in contact with the cam shaft 46, establishing a frictional engagement of the cam shaft 46 into a locking configuration relative to the locking groove 64. The spring 38 preferably establishes a threshold force which is required to be overcome for the rotation of the cam lock 30 in a direction opposite to arrow 104 in order to initiate disengagement of the cam shaft 46 from the locking groove 64 and the spiral twist locking axial slot 44.

Figure 14:
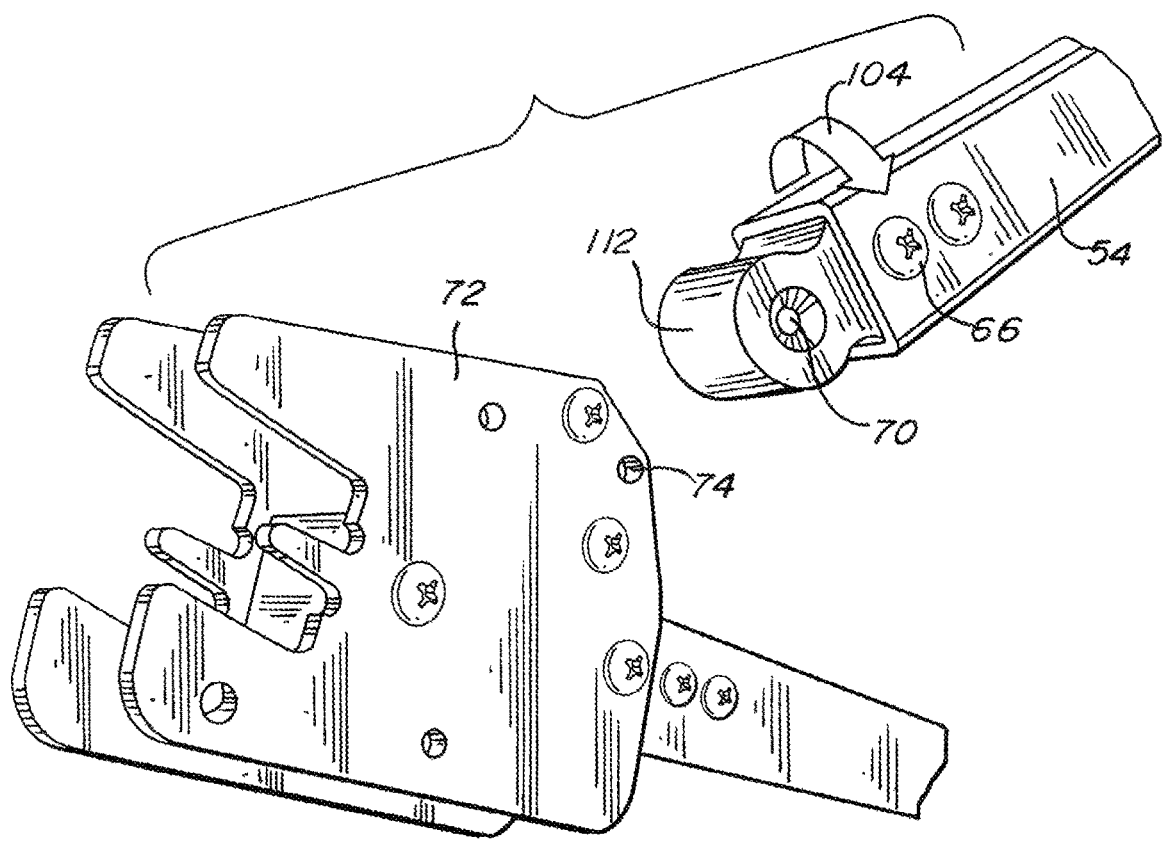
FIG. 14 is a detail partial exploded isometric perspective view of one alternative embodiment of structural supports engaged to a bracket.
Figure 15:
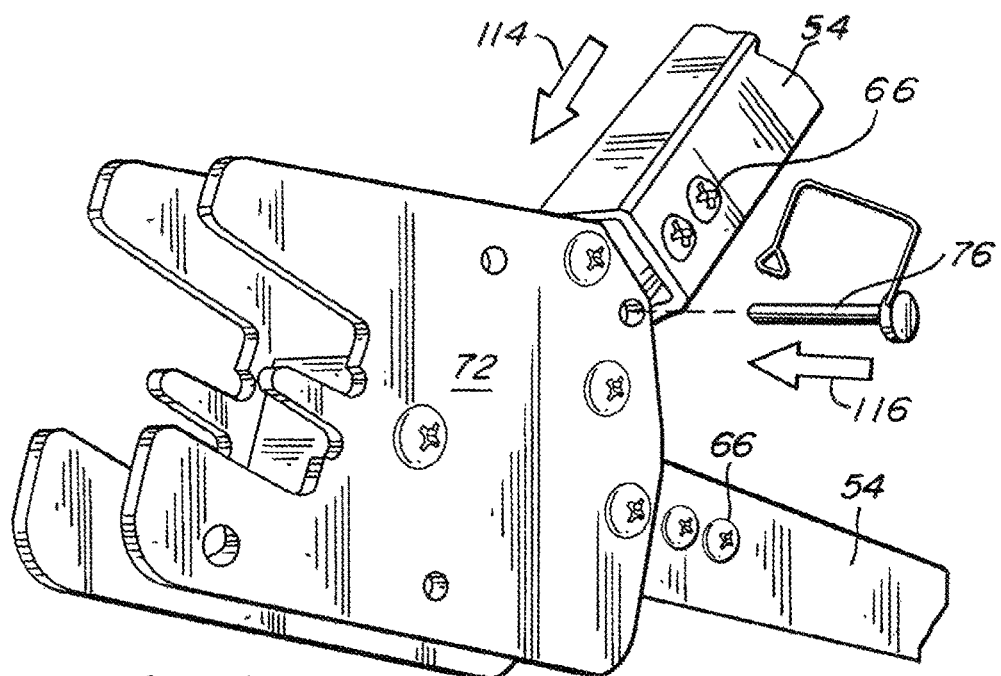
FIG. 15 is a detail partial isometric perspective view of one alternative embodiment of structural supports engaged to a bracket.

In at least one embodiment referring to FIG. 14 and FIG. 15, a structural support 54 may have an opposite end having a structural connector 112. Structural connector 112 may be substantially cylindrical in shape having an axis which is perpendicular to the longitudinal direction of the structural support 54. Structural connector 112 may have a rounded outer surface and a centrally disposed fastener receiving aperture 70. Structural connector 112 may also include a body portion having one or more tapped holes 52 which receive fasteners 66 to secure the structural connector 112 to the opposite end of the structural support 54. In at least one alternative embodiment, the structural connector 112 may be secured to the structural support 54 by welding or any other type of mechanical or chemical fastening alternative.

In at least one embodiment, the structural connector 112 is constructed for releasable engagement to a bracket 72 which is designed to releasably receive a cross support for engaging a removable cover 78. Bracket 72 further engages one or more structural supports 54 which in turn are engaged to a vehicle at opposite sides of removable cover 78.

In at least one embodiment, following rotation of the structural support 54 in the direction of arrow 104, and the engagement of the cam lock 30 to the mating bracket 48, the fastener receiving aperture 70 may be aligned with a pair of bracket apertures 74 of the bracket 72. Upon alignment of the fastener receiving aperture 70 with the bracket apertures 74 a releasable bracket fastener 76 or pin may secure the structural connector 112 and structural support 54 to the bracket 72. The insertion of the structural support 54 and structural connector 52 into bracket 72 is represented by arrow 114. The insertion of the releasable bracket fastener 76 or pin within a pair of bracket apertures 74 and the fastener receiving aperture 70 is represented by arrow 116.

In at least one embodiment, the components of the cam lock assembly 10 are formed of air craft grade aluminum, stainless steel, steel, other metal material, plastic or composite materials and combinations thereof. The material selected for the components of the cam lock assembly 10 are preferably sufficiently sturdy to not fracture or fail, when the cam lock assembly 10 is used for its intended purpose.

In at least one embodiment, the components of the cam lock assembly 10 are held in place by the spring 38, forcing the cam follower 36 onto the cam shaft 46 to prevent counter rotation of the cam lock 30 following engagement to the mating bracket 48. A dampener may also be used in conjunction with the spring 38 (or any other force generating device) to reduce or eliminate axial movement of the assembled components of the cam lock assembly 10. An external device/method may also be used to provide additional retention/anti-rotation force if required for a more permanent connection between the cam lock 30 and the mating bracket 48. The cam lock assembly 10 permits quick assembly without the use of tools or additional separate pieces by using only the self-contained components. The cam lock assembly 10 also provides positive feedback to an individual during the locking/unlocking process.

In some embodiments the spiral twist locking axial slot 44 also serves to create mechanical advantage for compressing the spring 38 to generate the retention force for holding/locking the cam follower 36 onto the cam shaft 46 as disposed in the locking groove 64, which in turn retains the assembled components of the cam lock assembly 10 in an engaged operative position. The geometry of the spiral twist locking axial slot 44 also serves to create a natural or desired twisting motion during insertion assembly/removal or disassembly of a cam lock 30 to or from a mating bracket 48.

In some embodiments the geometry of the spiral twist locking axial slot 44 may be altered to provide a desired amount of rotational force for engagement and locking relative to the cam shaft 46. For example, the relative vertical dimension of the spiral twist locking axial slot 44 along axis 105 (the tightness of the spiral twist) may be shortened or lengthened to provide a desired rotational and locking force required for assembly/disassembly as well as retention force between the cam lock 30 and bracket 48. Alternatively, the relative horizontal dimension of the spiral twist locking axial slot 44 in a direction normal to axis 105 (the width of the spiral twist) may be increased or decreased to provide a desired rotational and locking force required for assembly/disassembly as well as retention force between the cam lock 30 and bracket 48. Further the angle of the slot of the spiral twist locking axial slot 44 may be variable and may be increased or decreased at any location along the spiral twist locking axial slot 44 to provide a desired rotational and locking force required for assembly/disassembly as well as retention force between the cam lock 30 and bracket 48. In addition, in any desired embodiment the length, tightness, width and angle of incidence for the slot of the spiral twist locking axial slot 44 may be adjusted in any desired combination to provide a desired rotational and locking force required for assembly/disassembly as well as retention force between the cam lock 30 and bracket 48. It should also be noted that in association with the alternatives in geometry for the spiral twist locking axial slot 44 the strength of the spring 38 may vary to provide a desired rotational and locking force required for assembly/disassembly as well as retention force between the cam lock 30 and bracket 48.

In at least one embodiment, retention force is generated towards the shaft engagement end 56 of the spiral twist locking axial slot 44 due to the smaller diameter channel proximate to the frame engagement end 58 which permits expansion of the spring 38 on the cam follower 36. This allows for easy alignment of the spiral twist locking axial slot 44 onto the cam shaft 46 during initial insertion and twisting.

In some embodiments, the cam lock 30 may contain mounting holes/features for installation into/onto tubing or other structural pieces used in the assembly/construction of awning/canopy frame work or any other components required to be held together. The cam shaft 46 may be contained in a bracket which may be mounted to another structure such as the side of an enclosed trailer, building or fixed or semi-fixed structure.

The spiral twist locking axial slot 44 and mounting holes 66 may be used/altered to provide precise orientation of the assembled components of the cam lock assembly 10 for ease of initial installation. Also the location of the assembled components of the cam lock assembly 10 and features provide for precise final assembly location of components.

Unlocking of the components of the cam lock assembly 10 is performed in a reverse manner of twisting of the cam lock 30 onto a mating bracket 48, which is required to overcome the spring retention force exerted in the spiral twist locking axial slot 44 by the cam follower 36 upon the cam shaft 46. The spiral twist locking axial slot 44 provides desired/natural guidance during this process (similar as the insertion process). In at least one embodiment, the insertion and retention forces may be altered by changes to the path of the spiral twist locking axial slot 44, the spring 38 parameters, the cam follower 35 length, or the position or location of the detents 100.

The use of the cam lock assembly 10 speeds up installation of receptacles and enhances the low assembly time for the fastener installation. Naturally this is further enhanced by the fact that the entire fastening structure is incorporated on the receptacle and no separate fastener elements such as screws or bolts or rivets are required.

To unfasten the cam lock assembly 10 from a vertical or another surface 84, it is merely necessary to rotate the cam lock 30 in the opposite direction, thus permitting the cam shaft 46 to move upwardly or outwardly relative to the spiral twist locking axial slot 44 until the cam shaft 46 is disengaged from the cam lock 30.

It should be noted that the structural members 54 as connected to each other may be provided at any desired relative angle for erection of a temporary mobile event frame structure or apparatus such as awning canopy shelter frame.

In a first embodiment, a cam lock assembly includes a bracket, the bracket having a cam shaft, the bracket being constructed and arranged for engagement to a vertical or another surface; a cam lock, the cam lock having a bottom and a spiral axial slot opposite to the bottom, the spiral axial slot having a locking groove, the cam lock further having a traverse channel proximate to the bottom, the cam lock further having a central cam groove between the locking groove and the bottom, the cam lock further having a cam follower positioned in the central cam groove, a spring positioned in the central cam groove adjacent to the cam follower and a force stop positioned in the cam groove adjacent to the spring opposite to the cam follower, the cam lock further having a retention device disposed in the traverse channel; and an elongate structural support engaged to the cam lock proximate to the bottom, wherein the cam shaft is constructed and arranged for positioning in the spiral axial slot and the cam lock is rotated relative to the cam shaft moving the cam shaft into the locking groove.

In a second alternative embodiment according to the first embodiment, the cam shaft is positioned outwardly from the vertical or another surface, the cam shaft being disposed in a plane substantially parallel to the vertical or another surface.

In a third alternative embodiment according to the second embodiment, the cam lock has a shaft engagement end, the shaft engagement end having the spiral axial slot.

In a fourth alternative embodiment according to the third embodiment, the cam lock has a central the central cam groove being centered relative to the central axis.

In a fifth alternative embodiment according to the fourth embodiment, the central cam groove is in communication with the locking groove defining an intersection.

In a sixth alternative embodiment according to the fifth embodiment, the traverse channel extends through the central cam groove.

In a seventh alternative embodiment according to the sixth embodiment, in an first state the spring is compressed and the force stop is engaged to the retention device.

In an eighth alternative embodiment according to the seventh embodiment, the intersection defines at least one detent, the cam follower is engaged to the detent in an unlocked position.

In a ninth alternative embodiment according to the eighth embodiment, positioning of the cam shaft in the locking groove depresses the cam follower against the spring.

In a tenth alternative embodiment according to the eighth embodiment, the cam lock is cylindrical in shape.

In an eleventh alternative embodiment, a cam lock assembly includes a bracket, the bracket having a cam shaft, the bracket being constructed and arranged for engagement to a vertical or another surface, the cam shaft positioned outwardly from the vertical or another surface, the cam shaft being disposed in a plane substantially parallel to the vertical or another surface; a cam lock, the cam lock having a shaft engagement end having a spiral axial slot, the spiral axial slot having a locking groove, the cam lock further having a frame engagement end having a traverse channel, the cam lock further having a central axis and a central cam groove along the central axis, the central cam groove being in communication with the locking groove defining an intersection, the central cam groove extending from the intersection to the frame engagement end, the traverse channel extending through the central cam groove, the cam lock further having a cam follower positioned in the central cam groove, a spring positioned in the central cam groove adjacent to the cam follower and a force stop positioned in the cam groove adjacent to the spring opposite to the cam follower, the cam lock further having a retention device disposed in the traverse channel, wherein in an first state the spring is compressed and the force stop is engaged to the retention device, the intersection defining at least one detent, and the cam follower is engaged to the detent in the first state; and an elongate structural support engaged to the frame engagement end, wherein the cam shaft is constructed and arranged for positioning in the spiral axial slot and the cam lock is rotated relative to the cam shaft moving the cam shaft into the locking groove, and depressing the cam follower against the spring.

In a twelfth alternative embodiment according to the eleventh embodiment, the frame engagement end has at least one tapped hole and the elongate structural support is engaged to the at least one tapped hole.

In a thirteenth alternative embodiment according to the twelfth embodiment, the elongate structural support and the cam lock have a disassembled position relative to the mating bracket and an initial engaged position where the cam shaft is disposed in the spiral axial slot proximate to the shaft engagement end.

In a fourteenth alternative embodiment according to the thirteenth embodiment, the cam lock is rotated approximately 90 degrees, moving the cam shaft into the locking groove.

In a fifteenth alternative embodiment according to the fourteenth embodiment, the cam follower engages the cam shaft in a locking position and the spring exerts frictional force between the cam follower and the cam shaft in the locking position.

In a sixteenth alternative embodiment according to the fifteenth embodiment, the elongate structural support has an opposite end, the opposite end includes a structural connector.

In a seventeenth alternative embodiment according to the sixteenth embodiment, the structural connector includes a fastener receiving aperture.

In an eighteenth alternative embodiment according to the seventeenth embodiment, the fastener receiving aperture is in a plane substantially parallel to the cam shaft in the locking position.

In a nineteenth alternative embodiment according to the eighteenth embodiment, the cam lock assembly includes a bracket, the bracket including at least one pair of aligned apertures, wherein the structural connector is positioned proximate to the bracket aligning the fastener receiving aperture to the at least one pair of aligned apertures in the locking position.

In a twentieth alternative embodiment according to the nineteenth embodiment, a releasable bracket fastener is releasably positioned through the fastener receiving aperture and the at least one pair of aligned apertures in the locking position.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. A cam lock assembly comprising:
a bracket, said bracket having a cam shaft; and
a cam lock, said cam lock having a top end, a bottom end, and a spiral axial slot proximate to said top end, said spiral axial slot terminating at a locking groove positioned between said top end and said bottom end, said cam lock further having a central cam groove in communication with said spiral axial slot, said central cam groove extending from said spiral axial slot and traversing said bottom end, said cam lock further having a cam follower positioned in said central cam groove proximate to said locking groove, said cam follower being disposed at least partially in said spiral axial slot and said locking groove in an uncoupled position and in a pre-coupling unlocked position and, a spring positioned in said central cam groove adjacent to said cam follower and a force stop being disposed in said central cam groove proximate to said bottom end, said spring being between said cam follower and said force stop in said central cam groove, said cam lock further having at least one detent between said spiral axial slot and said locking groove;
wherein said cam shaft is spatially separated from and independent with respect to said cam lock in said uncoupled position, and further wherein said cam lock is constructed and arranged for insertion of said cam shaft from a normal direction into said spiral axial slot, said normal direction being perpendicular or angularly offset relative to said cam shaft in said pre-coupling unlocked position, and further wherein said spiral axial slot is constructed and arranged for engagement to said cam shaft and said cam lock is rotated in an eccentric first direction relative to said cam shaft moving said cam shaft into said locking groove in a releasable and coupled locked position, and wherein said cam follower is movable within said central cam groove and said cam follower is engaged to said at least one detent in said pre-coupling unlocked position and said uncoupled position and wherein said cam follower is separated from said at least one detent within said central cam groove upon positioning of said cam shaft into said locking groove in said releasable and coupled locked position.

2. The cam lock assembly according to claim 1, said cam lock having a central axis, said central cam groove being centered relative to said central axis.

3. The cam lock assembly according to claim 2, said central cam groove being in communication with said locking groove defining an intersection.

4. The cam lock assembly according to claim 3, said intersection defining said at least one detent.

5. The cam lock assembly according to claim 4, wherein positioning of said cam shaft in said locking groove depresses said cam follower against said spring.

6. The cam lock assembly according to claim 5, wherein said cam lock is cylindrical in shape.

7. The cam lock assembly according to claim 1, wherein said cam lock is rotated in a second direction relative to said cam shaft moving said cam shaft out of said locking groove and out of said releasable and coupled locked position spatially disengaging and separating said cam shaft from said cam lock and placing said cam shaft and said cam lock into said uncoupled position.

8. A cam lock assembly comprising:
a bracket, said bracket having a cam shaft; and
a cam lock, said cam lock having a shaft engagement end having a spiral axial slot, said spiral axial slot terminating at a locking groove, said cam lock further having a central axis and a central cam groove along said central axis, said central cam groove being in communication with said locking groove defining an intersection, said central cam groove extending from said intersection and traversing a bottom end, said cam lock further having a cam follower positioned in said central cam groove proximate to said locking groove, said cam follower being disposed at least partially in said spiral axial slot and said locking groove in an uncoupled position and in a pre-coupling unlocked position and a spring positioned in said central cam groove adjacent to said cam follower and a force stop being disposed in said central cam groove proximate to said bottom end, said force stop being adjacent to said spring opposite to said cam follower, wherein said intersection defines at least one detent, and said cam follower is engaged to said at least one detent in said uncoupled position and said pre-coupling unlocked position;
wherein said cam shaft is spatially separated from and independent with respect to said cam lock in said uncoupled position, and further wherein said cam lock is constructed and arranged for insertion of said cam shaft from a normal direction into said spiral axial slot, said normal direction being perpendicular or angularly offset relative to said cam shaft in said pre-coupling unlocked position, and further wherein said spiral axial slot is constructed and arranged for engagement to said cam shaft and said cam lock is rotated in an eccentric first direction relative to said cam shaft moving said cam shaft into said locking groove, and depressing said cam follower against said spring in a releasable and coupled locked position separating said cam follower from said at least one detent.

9. The cam lock assembly according to claim 8, wherein said cam lock is rotated approximately 90 degrees, moving said cam shaft into said locking groove.

10. The cam lock assembly according to claim 9, wherein said cam follower engages said cam shaft in said releasable and coupled locked position and said spring exerts frictional force between said cam follower and said cam shaft in said releasable and coupled locked position.

11. The cam lock assembly according to claim 8, wherein said cam lock is rotated in a second direction relative to said cam shaft moving said cam shaft out of said locking groove and out of said releasable and coupled locked position spatially disengaging and separating said cam shaft from said cam lock and placing said cam shaft and said cam lock into said uncoupled position.

12. A cam lock assembly comprising:
a bracket, said bracket having a cam shaft;
a cam lock, said cam lock having a bottom end and a spiral axial slot opposite to said bottom end, said spiral axial slot terminating at a locking groove, said cam lock further having a central cam groove extending between said locking groove and traversing said bottom end, said cam lock further having a cam follower positioned in said central cam groove, a spring positioned in said central cam groove adjacent to said cam follower and a force stop being disposed in said central cam groove proximate to said bottom end, said force stop being adjacent to said spring opposite to said cam follower; and
wherein said cam shaft is spatially separated from and independent with respect to said cam lock in an uncoupled position, and further wherein said cam lock is constructed and arranged for insertion of said cam shaft from a normal direction into said spiral axial slot, said normal direction being perpendicular or angularly offset relative to said cam shaft in a pre-coupling unlocked position, and further wherein said spiral axial slot is constructed and arranged for engagement to said cam shaft and said cam lock is rotated in an eccentric first direction relative to said cam shaft moving said cam shaft into said locking groove in a releasable and coupled locked position, said cam lock having a shaft engagement end, said shaft engagement end having said spiral axial slot, said cam lock having a central axis, said central cam groove being centered relative to said central axis, said central cam groove being in communication with said locking groove defining an intersection, said intersection defining at least one detent, said cam follower being engaged to said at least one detent in said pre-coupling unlocked position and said uncoupled position.

13. The cam lock assembly according to claim 12, wherein said cam lock is rotated in a second direction relative to said cam shaft moving said cam shaft out of said locking groove and out of said releasable and coupled locked position spatially disengaging and separating said cam shaft from said cam lock and placing said cam shaft and said cam lock into said uncoupled position.

\* \* \* \* \*